Figure 1:
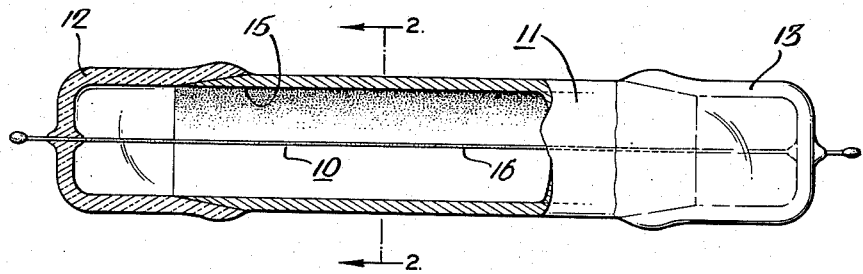

Feb. 16, 1960  R. MORGAN  2,925,510
GASEOUS ELECTRON TUBE
Filed June 20, 1957

INVENTOR:
RAYMOND MORGAN
BY Howson & Howson
ATTYS.

United States Patent Office 2,925,510
Patented Feb. 16, 1960

2,925,510

GASEOUS ELECTRON TUBE

Raymond Morgan, Highland, Md.

Application June 20, 1957, Serial No. 666,831

11 Claims. (Cl. 313—93)

This invention relates to an electronic tube that in operation depends upon the presence of gas or gases within its envelope, and particularly to tubes used for detection and measurement of radiation and particle emissions such as tubes of the Geiger-Muller type. Such tubes generally comprise two metal electrodes, usually a cylindrical metal cathode surrounding a wire anode.

Often in gas filled tubes a change in gas pressure will adversely affect operation or change operational characteristics of the tube. In particular, a change in gas pressure is very harmful to the performance of Geiger counters, and especially is this true if there is a change in the amount of active quenching agent present. Normally a self quenching halogen filled Geiger counter contains one or more inert gases, and one gas from the halogen group at pressures somewhat reduced from atmospheric pressure. If the partial pressure of one of these gases changes appreciably, the characteristics of the counter may change adversely affecting operation of the tube. Halogen gases used as the quenching agent in such tubes are particularly subject to such fluctuations in pressure and have caused many problems in the past.

Study of the matter has indicated that the changes in halogen partial pressure are due to absorption of the gas. This absorption may take the form of adsorption or chemisorption, the latter being equivalent to chemical reaction with tube constituents. In order for a gaseous tube to maintain stability there must be an equilibrium condition between the gases and the solids with which they come in contact within the tube. In an effort to accomplish this, it has been common practice in the process of filling a halogen counter with gases to allow the counter to stand for twenty-four hours in the presence of the pure halogen before the final filling. Theoretically, at least, if equilibrium conditions can be established and maintained, the life of a counter can be considered almost indefinite. This is true because a counter does not employ a heated cathode or other element which might deteriorate.

In accordance with the present invention, a high degree of stability and near equilibrium conditions are maintained within a gaseous electron tube envelope. This is accomplished by the provision of metallic surfaces which will tend to have a minimum of deleterious effect on the gaseous contents of the tube. Since the effect of glass or other like envelope materials is fairly well known and can be stabilized, the selection of the metallic surface materials within a suitable envelope should give a degree of stability and equilibrium which will mean exceptionally long tube life.

More specifically, the present invention provides at least a pair of spaced electrodes within a gas-filled envelope, the surface of at least one of which electrodes is coated with a titanium oxide. The gases within the envelope are an inert gas and a halogen gas. The inert gas is usually quite stable in its pressure but the halogen gas pressure tends to be unstable without the electrode coating described.

Figure 2:
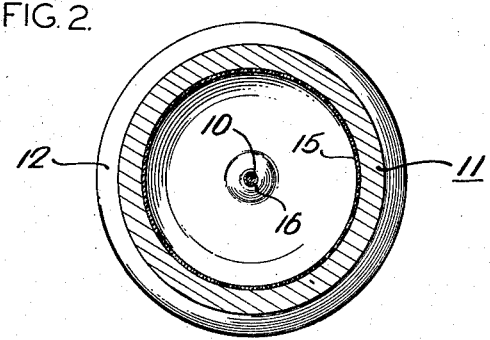

For better understanding of the present invention reference is made to the drawings in which:

Fig. 1 is an axial section taken through a tube in accordance with the present invention, and Fig. 2 is a section taken along line 2—2 of Fig. 1.

The tube illustrated in the drawings is a Geiger counter which is typical in that it has an anode 10 which is a rod of small diameter and hence relatively small surface area compared to the cathode 11. In this case the cathode 11 is made part of the wall of the vacuum envelope so that only its inside surface lies within the envelope. The envelope is completed by glass end closures 12 and 13 at opposite ends of the envelope which are sealed to cathode 11 in a conventional glass-to-metal seals. The anode 10, as shown, extends through these enclosures, but it may alternatively extend through only one of them.

Within the envelope is a filling of inert gas such as argon or neon and a halogen gas such as chlorine or bromine which serves as a quenching agent, the nature of which may be understood by reference to U.S. Patent No. 2,590,108 to Liebson. Any halogen gas has a tendency to react physically or chemically with the metal of the electrodes and to some extent with glass enclosures, in some manner classifiable in one of the categories mentioned above.

In accordance with the present invention, at least one of the electrodes 10 or 11 is coated with titanium oxide, and preferably both of them are coated. However, since the cathode 11 is of much larger area than the anode, it is more important that its area within the envelope be coated with a titanium oxide coating 15. A similar coating 16 on the anode is also desirable. In preferred embodiments of the invention the electrodes themselves may be composed of titanium metal.

The glass used for the envelope may be any of the ordinary glasses used for this purpose. However, the particular glass used is preferably selected experimentally by radio-active tracer technique or by other well established methods for best results so that the glass envelope material will not tend to upset equilibrium conditions otherwise established. Envelopes of fused quartz have been found to be very good. I have found by experiment that when the electrodes are coated with titanium oxide they become impervious to attack by the halogen gases.

The method of application of the oxide may differ from case to case, but one satisfactory means is first cleaning the electrode by chemical cleaning techniques, polishing it by electrolytic or mechanical techniques, and degassing it by heating it to a high temperature in a vacuum. The electrode may then be directly oxidized in an oxidizing atmosphere by heating, if the electrodes are titanium. On the other hand, if electrode is not titanium a titanium oxide in a suitable binder may be applied in such a way that the oxides are fused at surface and the volatile binder dispersed during a baking operation. An examination of the oxides formed by the direct heating method has disclosed that three oxides are present—rutile, anatase and brookite. The amount of rutile is normally very much larger than the other oxides present, and the amount of brookite is apparently extremely low. The exact nature of the oxides present, however, does not appear to be critical.

Testing of Geiger counters made in accordance with the present invention has indicated them to be much more stable than those of the prior art which have had the best known gas equilibrium characteristics.

I claim:

1. A gaseous electron tube comprising an envelope enclosing a gaseous material including an inert gas and a halogen gas and a pair of spaced electrodes having surfaces within the envelope and at least one of which is coated with a titanium oxide impervious to gases.

2. The tube of claim 1 in which both the electrodes are coated with titanium oxides.

3. The tube of claim 1 in which the cathode electrode forms part of the envelope.

4. The tube of claim 3 in which the cathode is a tubular member surrounding at least part of the anode and sealed at both ends to glass envelope portions.

5. The tube of claim 4 in which the cathode is coated with titanium oxide on its inside surface.

6. The tube of claim 5 in which both of the electrodes are coated with titanium oxides.

7. The tube of claim 1 in which an envelope of non-conducting material is coated in part on the inside surface with titanium oxide to form a cathode.

8. The tube of claim 7 in which one end of the envelope is closed with the non-conducting material through which the anode extends and the other end of the envelope is closed with a thin window capable of transmitting low energy particles.

9. The tube of claim 3 in which the cathode is a tubular member surrounding at least part of the anode and sealed at one end to a glass envelope portion through which the anode extends and at the other end with a thin window capable of transmitting low energy particles.

10. The tube of claim 1 in which a large proportion of the titanium oxide coating is rutile.

11. The tube of claim 1 in which at least one electrode having a titanium oxide coating is composed of rutile.

References Cited in the file of this patent

UNITED STATES PATENTS

| | | |
|---|---|---|
| 2,368,060 | Wooten | Jan. 23, 1945 |
| 2,474,851 | Liebson | July 5, 1949 |
| 2,612,615 | Fehr et al. | Sept. 30, 1952 |
| 2,714,680 | Warmoltz et al. | Aug. 2, 1955 |